S. P. A. WENSTRÖM.
APPARATUS FOR INTRODUCING GASES INTO LIQUIDS.
APPLICATION FILED NOV. 12, 1907.
913,596.  Patented Feb. 23, 1909.
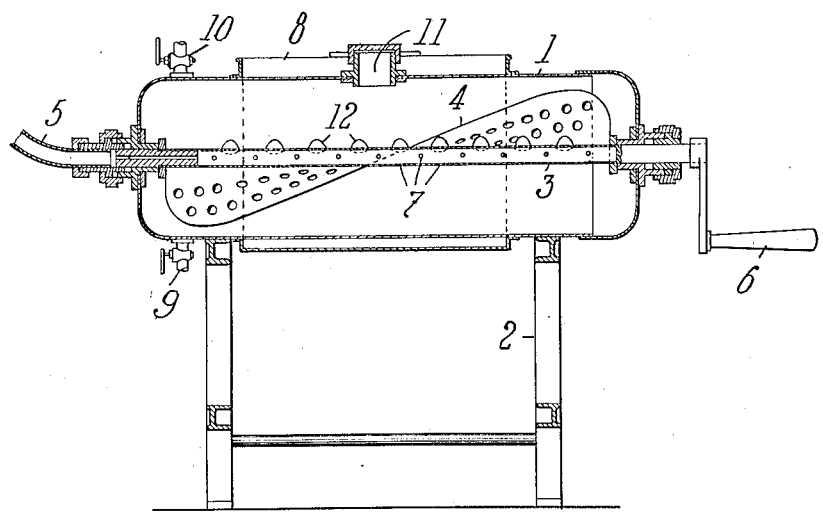
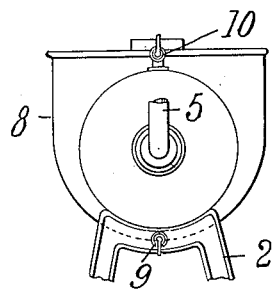
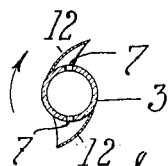

UNITED STATES PATENT OFFICE.

SVEN PETTER ALFRID WENSTRÖM, OF OSKARSHAMN, SWEDEN.

APPARATUS FOR INTRODUCING GASES INTO LIQUIDS.

No. 913,596.      Specification of Letters Patent.      Patented Feb. 23, 1909.

Application filed November 12, 1907. Serial No. 401,892.

*To all whom it may concern:*

Be it known that I, SVEN PETTER ALFRID WENSTRÖM, coppersmith, a subject of the King of Sweden, residing at Köpmangatan 68, in Oskarshamn, in the Kingdom of Sweden, have invented certain new and useful Improvements in Apparatus for Introducing Gases into Liquids, of which the following is a specification.

The present invention relates to such apparatus for introducing gases into liquids, as for instance apparatus for producing aerated or refreshing beverages, where the gases are in the form of fine streams introduced into the liquid through a hollow perforated body, as for instance a hollow perforated shaft, which is placed in the liquid to be treated below the surface of the same and is kept rotating during the treatment.

The object of the invention is to facilitate the absorption of the gas, for instance carbonic acid, introduced into the liquid, so that the treatment may be carried out in a shorter time than was possible with the apparatus hitherto used and at the same time render the said absorption as complete and uniform as possible. For this purpose there are, according to the present invention, obstacles, bafflers or dashers attached to the outer surface of the hollow perforated body or shaft through which the gases are introduced into the liquid and placed over the perforations of said body in such a way, that the streams of gases, which issue through the said perforations will meet said dashers and thereby be broken to form a fine spray which is intimately mixed with the fluid and absorbed by the same, the fluid being also in a high degree agitated and finely divided by means of the said dashers at the points where the gases meet with the liquid.

In order that my invention may be readily understood I will now describe it with reference to the accompanying drawing on which an apparatus for producing aerated beverages embodying the present invention is shown.

Figure 1 is a longitudinal section of the said apparatus and Fig. 2 is an end view of the same with a part of the supporting stand broken away. Fig. 3 shows in a larger scale a cross section of the hollow shaft through which the gases are introduced into the liquid.

1 is a closed receptacle for the reception of the liquid to be treated and is advantageously of cylindrical form. This receptacle is mounted on a frame or stand 2, and is provided with an inlet 11, for the introduction of the liquid. In the said receptacle there is arranged a perforated hollow shaft 3, rotatively journaled in suitable bearings, and supported in the ends of the receptacle, for instance in the manner shown in the drawing. Said shaft may be provided with a helical wing or blade 4, preferably perforated as shown in Fig. 1, but other suitable means for agitating the liquid in the receptacle, when the shaft is rotated, may be provided. The said shaft, at one of its ends outside the receptacle, is provided with suitable means for rotating the same, as for instance a crank handle 6, and the other end of said shaft is, by suitable means, air-tightly connected with a pipe 5, through which the carbonic acid, or other gases used for aerating the liquid, is introduced into the shaft. That portion of the said hollow shaft within the receptacle is provided with a comparatively large number of fine holes or perforations 7, so that the carbonic acid, or other gases, introduced into said hollow shaft 3, through the pipe 5, may enter the liquid in fine streams and be uniformly dispersed the whole length of the receptacle, the said liquid being, at the same time, agitated by rotating the shaft. In order however that the gases entering into the liquid through the perforations may be still more finely divided and intimately mixed with the fluid there are, according to the present invention, obstacles such as dashers or wings 12 attached to the said shaft over the perforations in such a way that the streams of gas issuing through the perforations meet the obstacles placed over this latter and thereby the streams of gas are broken into a fine spray which is easily absorbed by the fluid. The said obstacles may be of any suitable form. Preferably they are given the form of small wings, see Fig. 3 placed aslant over the perforations in the same direction as the shaft is rotated. Thereby is gained that the fluid which is met by the said wings will be in a high degree agitated and finely divided by the same at the points where the gas and the fluid meet each other.

8 is a jacket or casing surrounding a portion of the receptacle 1, the space between said jacket and the receptacle being packed with a cooling medium, such as ice, or the like, for regulating the temperature.

9 and 10 are valves for drawing off the liquid, or the gases, respectively when necessary. The liquid may be introduced into the receptacle through the opening 11 which, during the process, is kept closed.

Having now described my invention I declare that what I claim is:

1. An apparatus for introducing gases into liquids comprising a receptacle, a hollow rotary shaft mounted in said receptacle, provided with a plurality of radial perforations and connected to the gas supply, and a plurality of baffle plates mounted aslant on the shaft and extending transversely of the shaft across the perforations in the shaft to break the streams of gases entering the receptacle through the perforations.

2. An apparatus for introducing gases into liquids comprising a receptacle, a hollow rotary shaft mounted in said receptacle, provided with a plurality of radial perforations and connected to the gas supply, and a plurality of curved baffle plates secured to the shaft and extending transversely of the shaft across the perforations in the shaft and in the direction of rotation of the shaft.

In witness whereof I have hereunto set my hand in the presence of two witnesses.

SVEN PETTER ALFRID WENSTRÖM.

Witnesses:
　A. W. FAHLSKÄM,
　F. J. BERGQVIST.